Patented Sept. 28, 1948

2,450,342

UNITED STATES PATENT OFFICE 2,450,342

CHLOROHYDROXYNITROPHENYL SULFIDE

William F. Hester, Drexel Hill, and W E Craig, Philadelphia, Pa., assignors to Röhm & Haas Company, Philadelphia, Pa., a corporation of Delaware No Drawing. Application August 7, 1947, Serial No. 767,318

1 Claim. (Cl. 260—609)

This invention deals with bis(2-hydroxy-3-nitro-5-chlorophenyl) sulfide. This compound has remarkable fungicidal properties and may be used on green plants without phytocidal effects. It is also an effective parasiticide.

This compound is prepared from bis(2-hydroxy-5-chlorophenyl) sulfide by nitration. This latter compound may be made by reacting p-chlorophenol with sulfur chloride. The chlorohydroxyphenyl sulfide is then nitrated at 0° to 50° C. with nitric acid varying from 75% to 65% in strength. Solvents such as acetic acid, chloroform, carbon tetrachloride, acetylene tetrachloride, and ethylene chloride may be used.

As a typical method for the preparation of 2-hydroxy-3-nitro-5-chlorophenyl sulfide, there are taken 144 parts by weight of (2—OH—5—ClC$_6$H$_3$)$_2$S in 880 parts of ethylene chloride and 112.5 parts of 70% nitric acid gradually added. Cooling is used to keep the temperature below 40° C. A red solid precipitates. This is filtered off, washed with water, and dried. The yield amounts to 167 parts, melting at 192°–194° C. It corresponds in composition to the compound,

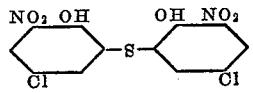

Some of this compound was dissolved in a small amount of acetone and the acetone solution was extended with water to give a 0.1% solution. At this dilution, it was toxic to fungi tested by the slide germination method (cf. J. Phytopathology, 33, 354), including *Macrosporium sarcinaeforme* Cav. and *Sclerotinia fructicola*. At a concentration of 0.005%, this compound still inhibited spores of *Sclerotinia fructicola* completely. At 0.001%, it inhibited the growth of 90% of the spores of this fungus.

A dust was prepared by dispersing the sulfide of this invention in clay and adjusting the concentration to 2%. Applied to potato plants, this dust gave a 99% kill of Colorado potato beetles. It was fairly toxic to the Mexican bean beetle, flea-beetle, cabbage worm, leafhopper, and confused flour beetle.

We claim:

As a new chemical compound, bis(2-hydroxy-3-nitro-5-chlorophenyl) sulfide.

WILLIAM F. HESTER.
W E CRAIG.

No references cited